United States Patent
Frutschi

[11] Patent Number: 6,038,848
[45] Date of Patent: Mar. 21, 2000

[54] METHOD FOR SPONTANEOUSLY INCREASING POWER IN OPERATION OF A POWER STATION SYSTEM

[75] Inventor: Hansulrich Frutschi, Riniken, Switzerland

[73] Assignee: Asea Brown Boveri AG, Baden, Switzerland

[21] Appl. No.: 08/966,864

[22] Filed: Nov. 10, 1997

[30] Foreign Application Priority Data

Dec. 13, 1996 [DE] Germany ............................ 196 51 882

[51] Int. Cl.⁷ .................................. F02C 3/26; F02C 3/30
[52] U.S. Cl. ......................... 60/39.05; 60/39.17; 60/39.3; 60/39.464
[58] Field of Search ................................ 60/39.03, 39.05, 60/39.182, 39.464, 39.17, 39.3, 39.58, 39.59

[56] References Cited

U.S. PATENT DOCUMENTS

| | | | |
|---|---|---|---|
| 3,434,281 | 3/1969 | Donaldson | 60/39.15 |
| 3,518,023 | 6/1970 | Britten | 60/39.15 |
| 4,214,435 | 7/1980 | Campbell | 60/39.464 |
| 4,893,468 | 1/1990 | Hines | 60/39.17 |
| 5,689,948 | 11/1997 | Frutschi | 60/39.05 |

FOREIGN PATENT DOCUMENTS 1401269   10/1968   Germany .

Primary Examiner—Louis J. Casaregola
Attorney, Agent, or Firm—Burns, Doane, Swecker & Mathis, L.L.P.

[57] ABSTRACT

In the case of a method for frequency support in operation of a power station system, the spontaneous power increase is carried out by supplying an additional medium (19) to the operating process of this power station system. This medium (19) is composed of a basic material (17) to which an amount of energy (18) required for its chemical and/or physical reaction is added. The medium (19) which is provided for the operating process is stored under pressure (26) in a container (20) and is available spontaneously at any time for its use.

8 Claims, 1 Drawing Sheet

METHOD FOR SPONTANEOUSLY INCREASING POWER IN OPERATION OF A POWER STATION SYSTEM

BACKGROUND OF THE INVENTION

1. Field of the Invention

The present invention relates to a method for spontaneously increasing power output in operation of power station system.

2. Discussion of Background

If, within a closed electrical power system, a relatively large power station block spontaneously drops off the network for any reason, the remaining power stations must be able to replace the lost power without delay to prevent immediate collapse of the network. The time available for it may be measured in seconds. All the attached rotating masses, such as turbine sets and driven machines admittedly act to damp the completion of the network collapse. However, if it is impossible to shed or disconnect unimportant loads immediately or to provide the lost power immediately in any other way, the network collapse will take place. Single-shaft gas turbines are particularly susceptible to a chain reaction of failures since their compressors can start to surge below a certain rotation speed, which is still very high.

On the other hand, single-shaft gas turbines are in fact particularly good at providing positive step-function changes in power.

In single-shaft gas turbines, a step-function change in power can be achieved by spontaneous water injection downstream of the compressor. However, such a precaution can result in a negative moment effect as the result of the inertia of the fuel system, such that the flame stability in the combustion chamber can no longer be ensured, there being an imminent risk of flame quenching. Furthermore, it is not possible to cope with a spontaneous load rise by such water injection, since, because of the reduction in temperature, the system temporarily produces a negative reaction to the desired load rise.

SUMMARY OF THE INVENTION

Accordingly, one object of the invention is to remedy this situation. The invention, as it is described in the claims, is based on the object, in the case of a method of the type mentioned initially, of proposing a precaution which allows a spontaneous positive step-function change in power.

To this end, the invention proposes that the inertia of the fuel system be overcome by directly adding to the added water, as the basic medium, the amount of fuel required to vaporize and overheat the steam produced to the mixing temperature. At the same time, the amount of water injected must, of course, be matched to the respective overload capacity of the generator, of the electrical power dissipation and of the machine components.

A major advantage of the invention is that a pressurized water supply enriched by a liquid fuel is preferably provided, whose injection device for injecting this mixture into the combustion chamber is preferably controlled by the gradient of the drop in frequency.

The basic medium on which this is based as well as the amount of fuel to be added are not limited to water and, respectively, oil. Other emulsions and solutions are also possible. Furthermore, it is directly possible to use a vapor or a gas as the basic medium.

Advantageous and expedient developments of the solution to the problem according to the invention are described in the other dependent claims.

An exemplary embodiment of the invention will be explained in more detail in the following text with reference to the drawing. All those elements which are not required for direct understanding of the invention have been omitted. The flow direction of the media is indicated by arrows.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein the single FIGURE shows a gas turbine group with sequential combustion and injection of a water mixture containing fuel.

DESCRIPTION OF THE PREFERRED EMBODIMENTS

Figure 1:
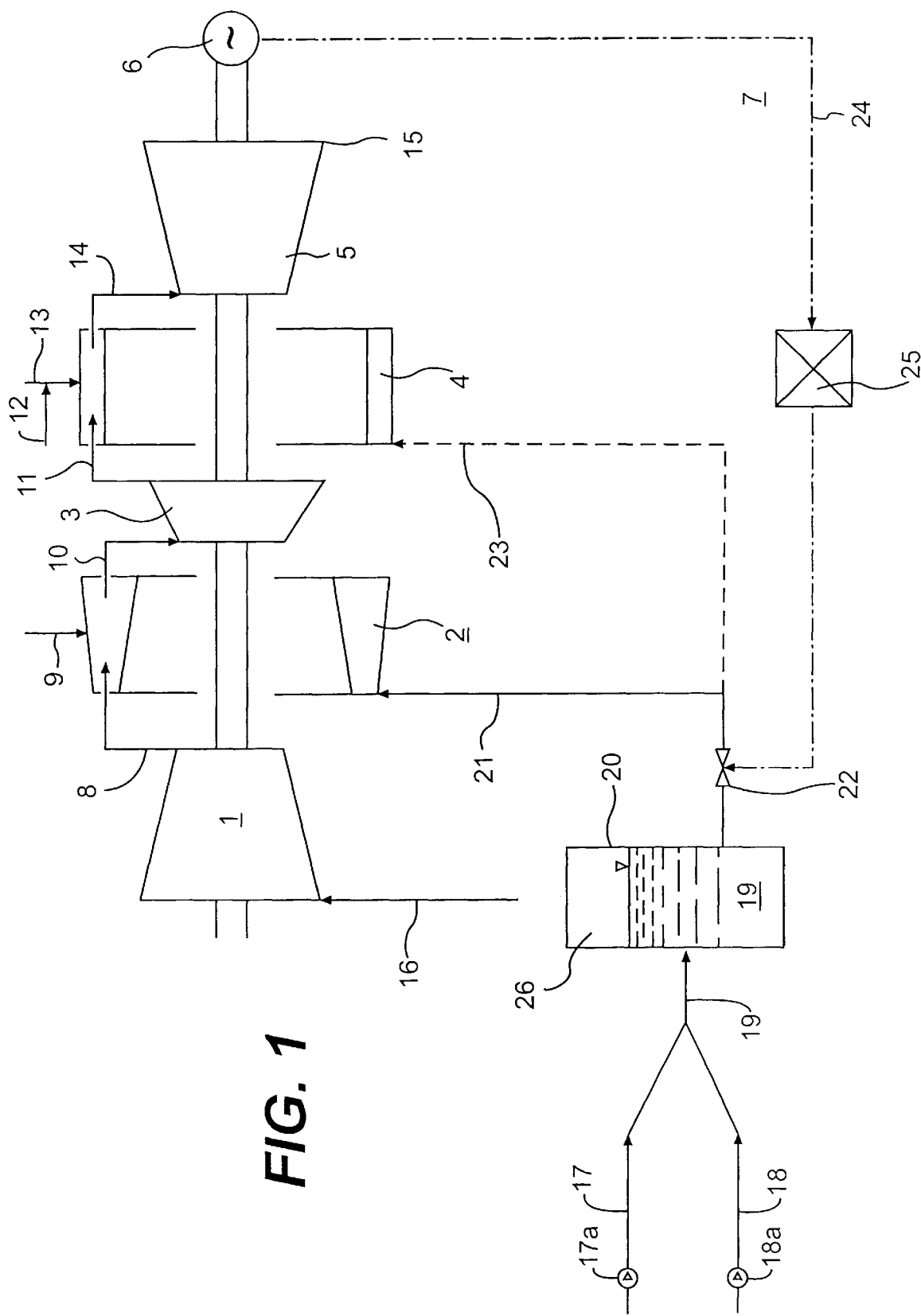

Referring now to the drawings, wherein like reference numerals designate identical or corresponding parts throughout the several views, the FIGURE shows a gas turbine group which comprises a compressor 1, a first combustion chamber 2 connected downstream of the compressor 1, called the HP combustion chamber in the following text, a HP turbine 3 which acts downstream of this combustion chamber, a second-combustion chamber 4 connected downstream of the HP turbine, called the LP combustion chamber in the following text, and an LP turbine 5 which acts downstream of this combustion chamber. A generator 6 provides the electricity production. The air 16 induced by the compressor 1 is passed, after the compression has been carried out, as compressed air 8 to the HP combustion chamber 2. This combustion chamber 2 is fired by a fuel 9 which may intrinsically be gaseous and/or liquid depending on the nature of the burner used in this combustion chamber. This combustion chamber 2 is normally operated with a diffusion burner; however, it is preferably operated with a premixing burner, as is described in EP-B1-0 321 809, this subject matter of the invention being an integral part of this description. The hot gases 10 from the HP combustion chamber 2 initially act on the HP turbine 3. In this arrangement, this turbine 3 is designed such that minimal expansion takes place here, such that its exhaust gases 11 are at a relatively high temperature. Located downstream of this turbine 3 is the LP combustion chamber 4, which is essentially in the form of an annular cylinder. This combustion chamber 4 does not have a conventional burner configuration: the combustion in this case takes place by self-ignition of a fuel 13 which is injected into the hot exhaust gases 11. Assuming that this is a gaseous fuel, that is to say for example natural gas, certain essential preconditions must be satisfied for self-ignition: first of all, it can be assumed that, with the present arrangement, self-ignition does not take place until a temperature of around 1000° C., and that this is also the case for partial load operation. However, this requirement can have an important negative effect on the optimal thermodynamic design of the gas turbine process. Thus, for thermodynamic reasons, the pressure ratio of the HP turbine 3 must not be raised to such an extent that it results in a low outlet temperature of, for example, about 500° C., as would be advantageous for reliable operation of a downstream conventional combustion chamber. In order to ensure reliable self-ignition of the LP combustion chamber 4 even in unfavorable conditions, the gaseous fuel 13 injected into the LP combustion chamber 4 can have added to it a quantity of another fuel 12, which has a low ignition temperature. Oil is preferably suitable here as the auxiliary fuel for a gaseous basic fuel. This liquid auxiliary fuel 12, appropriately injected, acts, so to speak, like a detonation cord and enables self-ignition in the LP combustion chamber 4 even if the exhaust gases 11 from the HP turbine 3 are at a temperature which is below that optimum self-ignition temperature. The hot gases 14 provided in the LP combustion chamber 4 then act on the LP turbine 5. The calorific potential of the exhaust gases 15 from this LP turbine 5 can be utilized to a greater extent, for example by connecting a steam circuit 7 downstream to provide an amount of steam to operate a steam turbine, and/or preheating of the injected water.

Particularly in the case of such a configuration, the calorific load on the combustion chambers and on the turbines is particularly high, for which reason the cooling must also be designed extremely efficiently. In this arrangement, it is at the same time also necessary to take account of the fact that gas turbine groups for this high-performance level in general cannot release much air for cooling purposes, to avoid reducing the efficiency and the specific power significantly. However, the calorifically loaded sets can advantageously be cooled by steam, a sufficient quantity and quality of which is available anyway in a downstream steam circuit.

A container 20 contains a specific amount of an emulsion or solution 19 which is pressurized 26 and is composed of an amount of water 17 and a correspondingly supplied amount of liquid fuel 18. The two media 17, 18 are fed by corresponding pumps 17a, 18a. If necessary, that is to say if a power increase becomes necessary spontaneously because of a threat of the network collapsing, this emulsion 19 is injected into the HP combustion chamber 2 and/or the LP combustion chamber 4. The amounts 21, 23 of such injection are provided by a controlled, simultaneously acting device 22, an initial injected amount being determined by the drop in the network frequency and/or the rotation speed of the gas turbine group. To this end, this device 22 is controlled by a signal 24 which is derived from the network frequency and is then processed in a computer 25. This computer 25 ensures, for example, that the continual, ongoing injection of the emulsion or solution takes place in accordance with a suitable rule, which is a function of the frequency and/or the rotation speed of the generator 6. The spontaneous power increase by injecting such an amount of water enriched by fuel is simultaneous; there is no delay in the response capability or even any reduction in the power in this case. The fuel enrichment of the emulsion or solution 19 as well as the amount of it injected are a function of the possible overload capacity of the generator 6, the electrical power dissipation and mechanical components. The injection of the fuel-enriched water may take place only temporarily. A change may be made successively to pure water with an increase in the fuel amounts 9/13. In the case of the gas turbine group described here with sequential combustion, an overload capacity of about 30% is possible from the thermodynamic point of view. As already mentioned, emulsions and solutions composed of various basic media with various types of fuel are possible, it also being possible for the state of the amount injected into the set to be gaseous. In principle, it is necessary to ensure that the amount of fuel 18 added to the water 17 is dimensioned such that the fuel energy carries out the vaporization of the water and overheats it to the mixing temperature at the inlet of the corresponding turbine 3, 5. If the fuel is alcohol, a solution with about 15–20% alcohol content in water is accordingly required. Such a solution corresponds to that of an alcoholic solution and can be stored without any problems in containers 20.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for spontaneously increasing power output in operation of a power station system comprising a gas turbine with sequential combustion in a first and a second combustion chamber and an electrical generator connected to the gas turbine, said method comprising:

spontaneously increasing power by supplying an additional amount of a mixture of fuel oil and water into the second combustion chamber, the second combustion chamber being self igniting, such that the amount of additionally supplied fuel oil/water mixture compensates for a power drop in an electrical network immediately after a threat of the network collapsing.

2. The method as claimed in claim 1, further comprising monitoring a frequency of the electrical network for determining the power drop, the amount of additionally supplied fuel oil/water mixture being a function of a frequency drop after the threat of the network collapsing.

3. The method as claimed in claim 2, wherein the amount of additionally supplied fuel oil/water mixture is inversely proportional to the frequency drop after the threat of the network collapsing.

4. The method as claimed in claim 1, wherein the amount of additionally supplied fuel oil/water mixture is a function of a rotation speed of the generator.

5. The method as claimed in claim 1, wherein the mixture of fuel oil and water for the operating process of the power station system is kept under a pressure.

6. The method as claimed in claim 5, wherein the continuous supply of the mixture of fuel oil and water to the process of the power station system is carried out via a controlled device.

7. The method as claimed in claim 1, wherein the addition of the amount of fuel is dimensioned such that the vaporization of the amount of water and its overheating to the mixing temperature take place at the inlet of the turbine of the power station system.

8. The method as claimed in claim 1, wherein the power station system has at least one gas turbine group, whose operation is maintained by at least one combustion chamber.

* * * * *